(12) United States Patent
Kraft

(10) Patent No.: US 7,375,294 B2
(45) Date of Patent: May 20, 2008

(54) SCALES COMPRISING A CAMERA

(75) Inventor: Horst Kraft, Balingen-Dürrwangen (DE)

(73) Assignee: Bizerba GmbH & Co. KG, Balingen (DE)

( * ) Notice: Subject to any disclaimer, the term of this patent is extended or adjusted under 35 U.S.C. 154(b) by 0 days.

(21) Appl. No.: 11/126,525

(22) Filed: May 11, 2005

(65) Prior Publication Data

US 2006/0213695 A1    Sep. 28, 2006

(30) Foreign Application Priority Data

Mar. 23, 2005   (DE) ..................... 10 2005 014 626

(51) Int. Cl.
*G01G 19/40* (2006.01)

(52) U.S. Cl. ............... 177/25.15; 235/383; 705/16; 186/61

(58) Field of Classification Search ............ 235/383; 177/25.15; 705/16; 186/61
See application file for complete search history.

(56) References Cited

U.S. PATENT DOCUMENTS

| | | | | |
|---|---|---|---|---|
| 5,019,694 A * | 5/1991 | Collins, Jr. | ................ | 235/383 |
| 5,042,619 A * | 8/1991 | Kohno | .................. | 186/61 |
| 5,070,966 A * | 12/1991 | Brennan | ................. | 186/61 |
| 5,115,888 A * | 5/1992 | Schneider | ............... | 186/61 |
| 5,177,345 A * | 1/1993 | Baitz | ...................... | 186/61 |
| 5,992,570 A * | 11/1999 | Walter et al. | ............ | 186/36 |
| 6,201,473 B1 * | 3/2001 | Schaffer | ............. | 340/568.5 |
| 6,547,040 B2 * | 4/2003 | Goodwin, III | ........... | 186/61 |
| 6,982,388 B2 * | 1/2006 | Kasinoff | ................ | 177/2 |
| 6,990,463 B2 * | 1/2006 | Walter et al. | ............ | 705/16 |
| 2003/0120547 A1 * | 6/2003 | Walter et al. | | |
| 2005/0090310 A1 * | 4/2005 | Knust et al. | | |

FOREIGN PATENT DOCUMENTS

DE    102 42 147 A1    3/2004
EP    0 443 419 B1    8/1991

\* cited by examiner

*Primary Examiner*—Randy W. Gibson
(74) *Attorney, Agent, or Firm*—Leydig, Voit & Mayer, Ltd.

(57) ABSTRACT

In order to provide scales, comprising a weighed-product receiving region and a terminal positioned at a vertical spacing from the weighed-product receiving region, that are easy to operate, it is proposed that at least one camera with a field of view towards the weighed-product receiving region is disposed on the terminal.

18 Claims, 3 Drawing Sheets

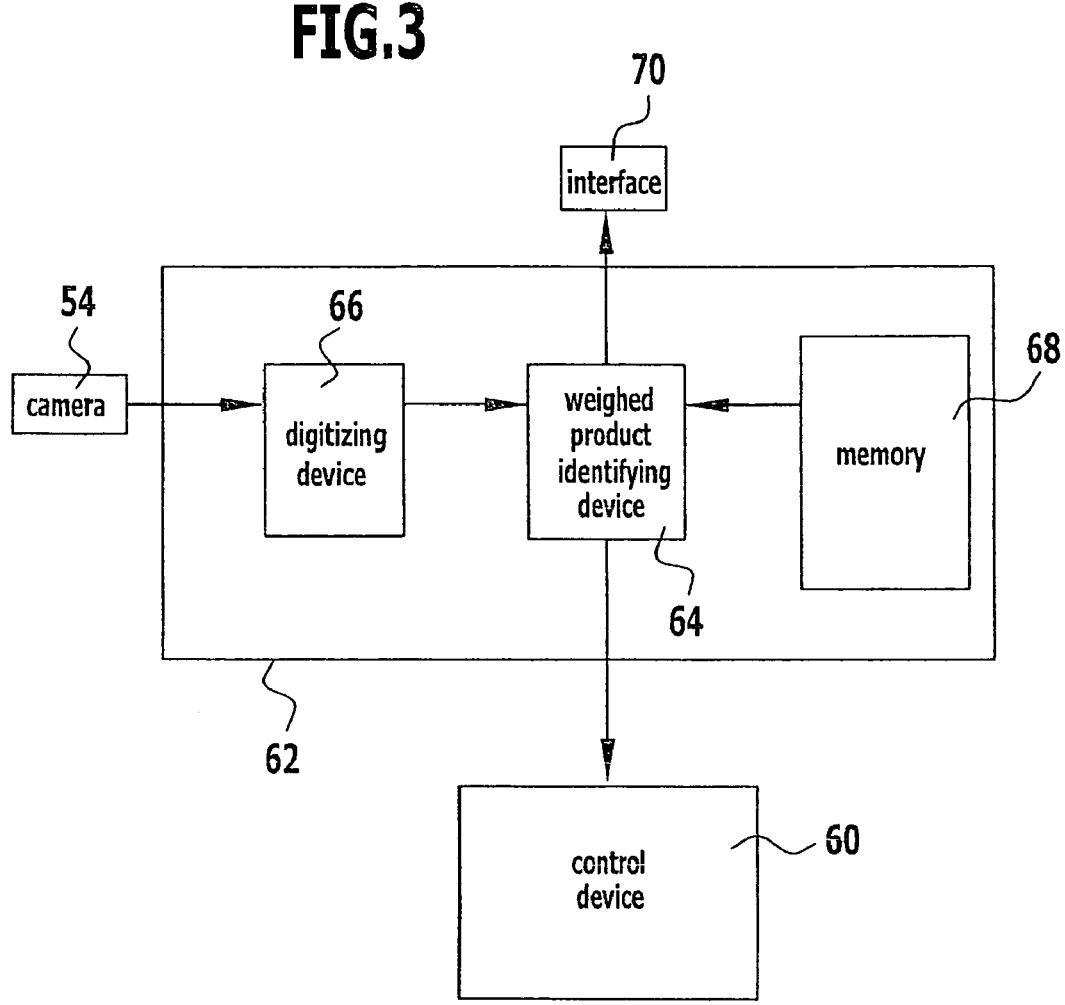

SCALES COMPRISING A CAMERA

The present disclosure relates to the subject matter disclosed in German application number 10 2005 014 626.0 of Mar. 23, 2005, which is incorporated herein by reference in its entirety and for all purposes.

BACKGROUND OF THE INVENTION

The invention relates to scales, comprising a weighed-product receiving region and a terminal positioned at a vertical spacing from the weighed-product receiving region.

Such scales are used in particular as shop scales for operation by a salesperson or as self-service scales.

Shop scales, which comprise a support base having a weighing apparatus as well as a terminal having a display device and disposed on a pillar at a vertical spacing from the support base, is known from DE 102 42 147 A1.

SUMMARY OF THE INVENTION

In accordance with the invention, scales are provided which are simple to operate.

In accordance with the invention, at least one camera with a viewing direction towards the weighed-product receiving region is disposed on the terminal.

The terminal is disposed above the weighed-product receiving region. The camera may therefore be integrated in an "unobtrusive" and protected manner into the scales. This means in particular that there is no need to provide a separate camera support. The camera may be protected against tampering. In particular, it is possible to safeguard camera settings, such as e.g. a field-of-vision setting and a focus setting.

The at least one camera is advantageously disposed at least partially in a housing of the terminal. The terminal usually has a housing, in any case, which accommodates, for example, a control device and a printer. In this housing the camera may be disposed in a protected manner.

In said case, it is particularly advantageous when the at least one camera is integrated into a housing of the terminal. The camera therefore does not project beyond the housing and is not immediately detectable by an operator. In the case of self-service scales, this reduces the risk of vandalism. This is therefore generally an easy way to protect the camera from mechanical damage.

It is advantageous when an optical imaging device of the at least one camera, such as an objective or a camera lens, is disposed on a side of the terminal facing the weighed-product receiving region. It is thereby possible to realize a free field of view towards weighed product on the weighed-product receiving region.

It is advantageous when an optical imaging device of the at least one camera is set back relative to an outer side of the terminal. For example, a housing of the terminal has at the appropriate outer side a recess, where the optical imaging device, such as e.g. a camera lens, is seated. The optical imaging device, and hence the camera as a whole, therefore does not project beyond the outer side of the terminal and is therefore "hidden". This means that it is better protected and the risk of e.g. vandalism is reduced.

It is advantageous when the at least one camera is disposed and designed in such a way that its field of view covers the entire weighed-product receiving region. In the case of the solution according to the invention, where the camera is disposed on the terminal, this may easily be achieved.

In particular, the field of view of the at least one camera is permanently set. This permanent setting is carried out in particular when the camera is installed in the terminal. At the same time, the focus may also be permanently set. It is possible to ensure that subsequent manipulation from the outside, e.g. by an operator, is not possible.

It is advantageous when the weighed-product receiving region is designed in such a way that luminous reflectance is suppressed. In this way, the imaging may be improved. It is then possible, at least for normal light conditions, to dispense with a special light source for the scales (i.e. an internal light source of the scales); the light conditions in a sales area are generally adequate for image acquisition by the camera.

A suppression of luminous reflectance at the weighed-product receiving region may easily be achieved when a reflection-suppressing foil is disposed on the weighed-product receiving region. The foil, with which the weighed-product receiving region is provided, is in particular monochrome. This is an effective way of achieving a suppression of reflectance.

It may be provided that the terminal comprises at least one printer and/or at least one display device and/or at least one operating device. The terminal may be used to operate the scales. An operator may then, for example, allocate a price to the weighed product.

It is advantageous when an optical imaging device of the at least one camera is disposed below the display device and/or below the operating device. In this way, an unimpeded field of view towards the weighed product e.g. on a weighing scale is ensured.

In one form of construction, the terminal is mounted on at least one pillar. This allows the terminal to be positioned above the weighed-product receiving region. This makes operation easier for an operator as, for example, a display device is situated closer to eye level. Access to an operating device is facilitated.

In particular, the at least one pillar is mounted on a support base. The terminal in said case projects at least partially above the weighed-product receiving region.

It is advantageous when an interface is provided for transmitting image data. This allows radio transmission or line transmission of image data to an external evaluation device. It is therefore possible, for example, to realize a monitoring function; it is possible to monitor whether an operator is correctly categorizing the weighed product.

It is also possible to provide a weighed-product identifying device, by means of which weighed product may be identified, in particular, automatically. It is then possible to carry out automatic price allocation. This results in a high level of operating comfort. A device for determining the sales price of goods that are temporarily disposed on a presentation surface (wherein the presentation surface may be the load plate of scales) is disclosed in EP 0 443 419 B1.

It is advantageous when a memory is provided for storing reference data. The reference data may be image data and/or reference characteristics. Weighed-product identification may be effected by comparing actual image data with reference data. For example, weighed-product identification may be carried out on the basis of the criteria: shape, surface texture, colour and size.

It is advantageous when the scales comprise a teach-in function for reading in reference data. Reference data may then be produced directly at the scales. This widens the operating scope. For example, in a teach-in procedure a "new" type of weighed product is placed onto the weighed-product receiving region and image data are acquired by the camera and stored, with or without prior editing, in the memory. In this way, reference data have been produced for this new type of weighed product.

The following description of preferred embodiments is used in connection with the drawings to provide a more detailed explanation of the invention.

BRIEF DESCRIPTION OF THE DRAWINGS

FIG. 3 a diagrammatic view of an evaluation device of the scales according to FIG. 1.

DETAILED DESCRIPTION OF THE INVENTION

Figure 1:
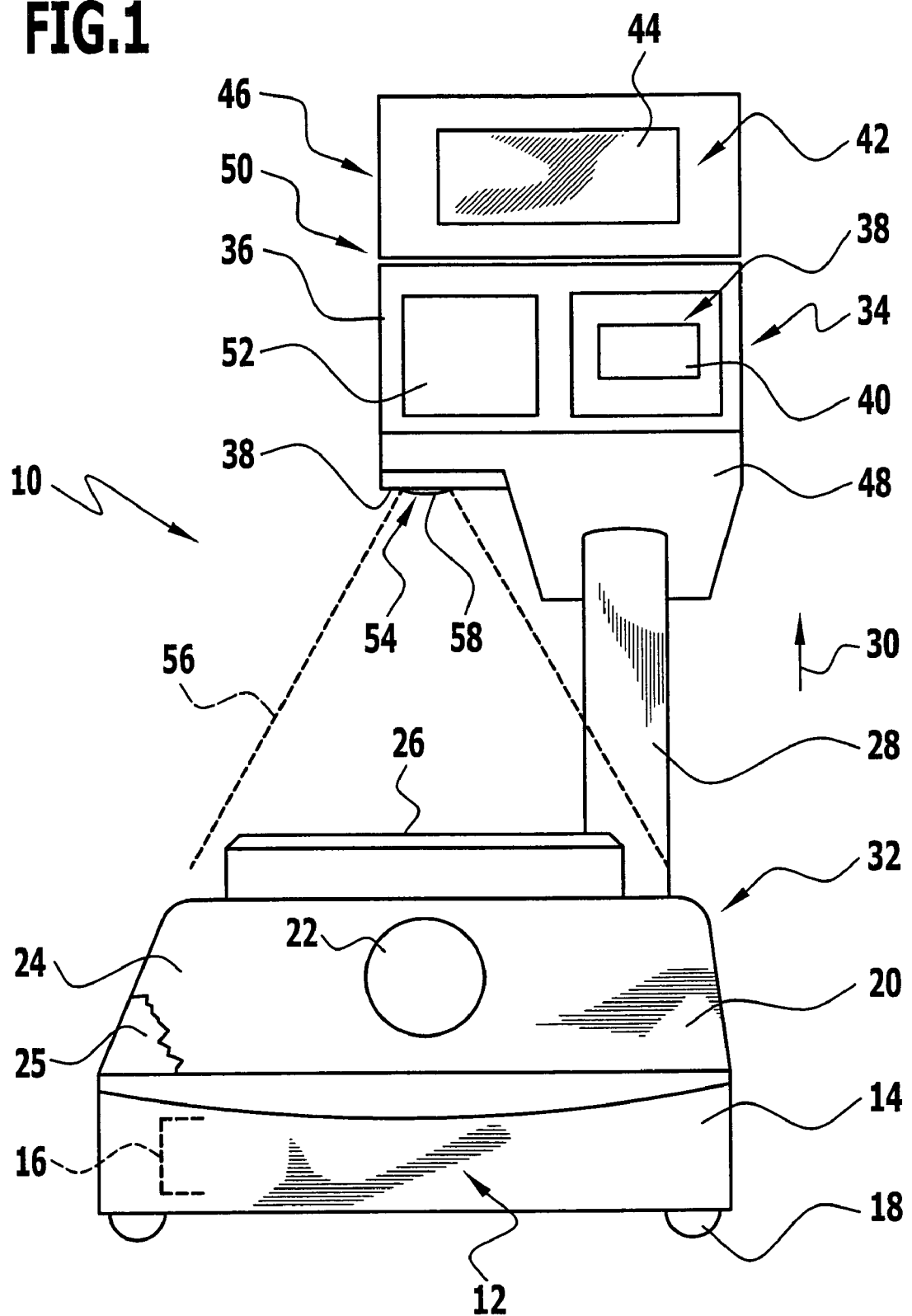
FIG. 1 a diagrammatic perspective view of an embodiment of scales according to the invention.
Figure 2:
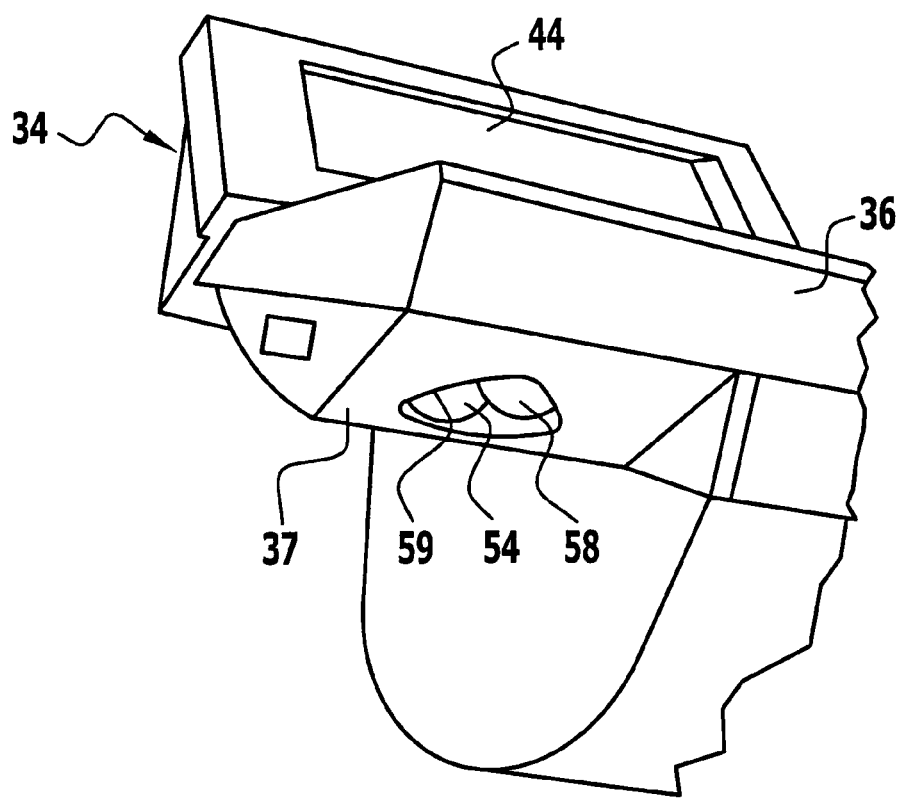
FIG. 2 a detail view of a terminal of the scales according to FIG. 1.

An embodiment of scales according to the invention, which is shown in FIG. 1 and denoted there by 10, comprises a support base 12 having a housing 14. A weighing apparatus 16 is disposed in the housing 14. Arranged on the housing 14 are feet 18, by which the support base is positionable on the ground. The feet 18 may be, for example, screw-in feet.

Positioned on the support base 12 is a weighing scale 20 and/or load plate, onto which weighed product 22 may be placed. By means of the weighing scale 20 and/or load plate, a weighed-product receiving region 24 is formed on the scales 10.

The weighed-product receiving region 24 is designed in such a way that luminous reflectance is suppressed. For example, it is provided with a monochrome, reflection-suppressing foil 25.

Disposed on the housing 14 is a frame 26, which projects beyond the weighing scale 20. The frame 26 serves as a "railing" to prevent weighed product from falling off in a backward direction.

A pillar 28 is mounted on the housing 14. This pillar 28 extends in a direction 30 that is transverse and, in particular, perpendicular to a weighed-product receiving surface of the weighed-product receiving region 24. The pillar 28 is disposed, for example, cylindrically.

The pillar 28 is disposed on or in the vicinity of a corner region 32 of the housing 14.

The pillar 28 supports a terminal 34, wherein the terminal 34 is positioned at a spacing from the weighed-product receiving region 24. When the scales 10 are placed by their support base 12 in a correct manner on the ground, the terminal 34 is then positioned at an, in relation to the direction of gravitational force, vertical spacing from the scales 20.

The terminal 34 comprises a housing 36 having an underside 37, which faces the weighed-product receiving region 24. The underside 37 forms an outer side of the housing 36 that faces the weighed-product receiving region 24.

Disposed on the terminal 34 is at least one printer 38, wherein the corresponding printer mechanism is accommodated in the housing 36. The terminal 34 has an output field 40, from which printed labels emerge and may be removed.

The housing 36 has on its underside a set-back recess 59, in which the optical imaging device 58 is at least partially seated. Consequently, the optical imaging device 58 is set back relative to the underside 37 and therefore disposed in a protected manner on the housing 36; the overall effect of this is that the camera 54 is positioned in a protected manner on the housing 36 because it does not project beyond the housing 36. The camera 54 is therefore not immediately detectable from the outside, which also affords a certain protection against vandalism.

The terminal 34 comprises a display device 42 with a display 44. In the embodiment shown in FIG. 1, the display 44 is aligned substantially parallel to the pillar 28. A display device region 46 of the terminal 34 forms an upper end of the terminal 34. This region 46 is disposed above a receiving region 48 for the printer 38.

The terminal 34 comprises an operating device 50, which an operator may use to enter data. For example, the display 44 is designed as a touch screen display and an operator may enter data using the combined display device/operating device.

It is alternatively or additionally possible to provide an operator panel 52 in the form of a keyboard; an operator may then use a keypad to enter data. Such an operator panel 52 is preferably disposed alongside the output field 40 for the printer 38. In particular, the operator panel 52 is arranged inclined relative to the longitudinal direction of the pillar 28, thereby making it easier for an operator to operate the keyboard.

Disposed on the terminal 34 is (at least) one camera 54, which has a field of view 56 that includes the weighed-product receiving region 24. The field of view 56 of a camera 54 is conical; given a plurality of cameras, the field of view is composed of such light cones. The at least one camera 54 is in said case disposed and designed in such a way that the entire weighed-product receiving region 24 lies in the field of view 56.

The field of view 56 is preferably permanently set, thereby preventing its manipulation by an operator. Preferably, the focus setting is also predefined when the camera 54 is installed in the housing 36.

An optical imaging device 58 of the camera 54 (in particular, a camera lens and/or a camera objective) is disposed at the underside 37 of the terminal 34, wherein this underside 37 is directed towards the weighing scale 20. The camera 54 is positioned entirely or at least for the most part in the housing 36 of the terminal 34 and therefore integrated into the housing 36.

The camera 54 produces image data regarding the weighed-product receiving region 24. In this way, image data for weighed product 22 resting thereon may be produced.

In the housing 36 of the terminal 34 a control device 60 of the scales 10 is disposed. The printer 38, the display device 42 and the operating device 50 are connected to the control device 60. The weighing apparatus 16 is likewise connected to the control device 60. The control device 60 controls the display device 42 and the printer 38 in dependence upon signals originating from the operating device 50 and the weighing apparatus 16.

The control device 60 is connected to an evaluation device 62 for data recorded by the (at least one) camera 54. The evaluation device 62 further comprises a weighed-product identifying device 64. Supplied to this weighed-product identifying device are (image) date of the camera 54. A digitizing device 66 may be series-connected to the weighed-product identifying device 64 for digitizing camera data, if these are not yet in digital form.

If the camera 54 is a digital camera, then as a rule the digitizing device 66 is not required.

The weighed-product identifying device 64 is connected to a memory 68, in which reference data are storable. The reference data may be, for example, reference images of possible weighed-product subjects and/or characteristic data of possible weighed-product subjects. When the weighed-product identifying device 64 receives image data supplied by the camera 54, the weighed-product identifying device 64 may carry out a comparison with stored reference subjects and/or stored reference characteristics in order to be able to identify the weighed product 22 on the weighed-product receiving region 24.

In particular, weighed-product identification is carried out on the basis of the criteria: colour, surface texture, shape and size. The corresponding procedures are implemented, in particular, by means of image processing software.

By means of the evaluation device 62, weighed product may be identified automatically. In the event of a successful automatic identification procedure, the weighed-product identifying device 64 supplies corresponding signals to the control device 60. There, for example, a weight signal supplied by the weighing apparatus 16 may then be combined with a weighed-product identification signal. A price may then be automatically indicated at the display device 42 and printed out.

It is, for example, also possible, in the event of an unsuccessful automatic identification procedure, for the available options to be displayed at the display 44 for an operator, who may then make a selection.

The evaluation device 62 may be designed in the manner described in EP 0 443 419 B1, wherein, as mentioned above, the camera 54 may be a digital camera and so a digitizing device 66 is not required.

The evaluation device 62 may comprise an interface 70 enabling the transmission of image data. Transmission in said case may be line transmission or radio transmission. The interface 70 may be connected to the weighed-product identifying device 64 and/or directly to the camera 54.

Data in raw form and/or evaluated image data may then be transmitted to a remote device. It is then possible, for example, in the case of self-service scales, to monitor whether an operator is entering correct product data.

It may be provided that the scales 10 have a teach-in function, by means of which reference data may be produced directly at the scales 10. For a teach-in procedure, a specific weighed product is placed onto the weighed-product receiving region 24. The teach-in function has previously been activated; for example, password-protected access to the control device 60 (and in particular to a scales menu) is provided, by means of which the teach-in function may be activated. The camera 54 then acquires image data of the placed weighed product. These image data are written as reference data directly or after prior editing into the memory 68.

Such a teach-in procedure may be necessary when no reference data exist for a specific weighed product.

The terminal 34 projects at least partially above the weighing scale 20. It is thereby guaranteed that the weighed-product receiving region 24 lies in the field of view 56 of the camera 54. The camera 54 in said case is disposed, at least with regard to its optical imaging device 58, below the display device 42 and below the operating device 50. This affords the camera 54 an unimpeded view of the weighed-product receiving region 24.

The invention claimed is:

1. Scales, comprising:
   a weighing scale or a load plate with a weighed-product receiving region for providing weight signals; and
   a terminal positioned at a vertical spacing from the weighed-product receiving region;
   wherein at least one camera with a viewing direction towards the weighed-product receiving region is integrated into a housing of the terminal, said at least one camera not projecting beyond the housing; and
   a weighed product identifying device which is supplied by image data of the at least one camera, said weighed product identifying device carrying out weighed-product identification with image processing; and
   means for combining weighed-product identification signals and weight signals.

2. Scales according to claim 1, wherein an optical imaging device of the at least one camera is disposed on a side of the terminal facing the weighed-product receiving region.

3. Scales according to claim 1, wherein an optical imaging device of the at least one camera is set back relative to an outer side of the terminal.

4. Scales according to claim 1, wherein the at least one camera is disposed and designed in such a way that its field of view covers the entire weighed-product receiving region.

5. Scales according to claim 4, wherein the field of view of the at least one camera is permanently set.

6. Scales according to claim 1, wherein the weighed-product receiving region is designed in such a way that luminous reflectance is suppressed.

7. Scales according to claim 6, wherein a reflection-suppressing foil is disposed on the weighed-product receiving region.

8. Scales according to claim 7, wherein the foil is monochrome.

9. Scales according to claim 1, wherein the terminal comprises at least one printer.

10. Scales according to claim 1, wherein the terminal comprises at least one display device.

11. Scales according to claim 10, wherein an optical imaging device of the at least one camera is disposed below the display device.

12. Scales according to claim 1, wherein the terminal comprises at least one operating device.

13. Scales according to claim 12, wherein an optical imaging device of the at least one camera is disposed below the operating device.

14. Scales according to claim 1, wherein the terminal is mounted on at least one pillar.

15. Scales according to claim 14, wherein the at least one pillar is mounted on a support base.

16. Scales according to claim 1, wherein an interface is provided for transmitting image data.

17. Scales according to claim 1, wherein a memory is provided for storing reference data.

18. Scales according to claim 1, wherein a teach-in function is provided for reading in reference data.

* * * * *

UNITED STATES PATENT AND TRADEMARK OFFICE
CERTIFICATE OF CORRECTION

PATENT NO. : 7,375,294 B2
APPLICATION NO. : 11/126525
DATED : May 20, 2008
INVENTOR(S) : Horst Kraft It is certified that error appears in the above-identified patent and that said Letters Patent is hereby corrected as shown below:

IN THE CLAIMS:

In Claim 1, Column 6, line 10 should read:

"camera not projecting beyond the housing; and" should read --camera not projecting beyond the housing and taking product image data of products on the weighted-product receiving region; and--.

Signed and Sealed this

Fifth Day of August, 2008

JON W. DUDAS
*Director of the United States Patent and Trademark Office*